Jan. 23, 1973 J. R. MARTIN 3,712,974

COMPUTATIONAL HEXADECIMAL SLIDE RULE

Filed Jan. 7, 1972 2 Sheets-Sheet 1

Jan. 23, 1973 J. R. MARTIN 3,712,974

COMPUTATIONAL HEXADECIMAL SLIDE RULE

Filed Jan. 7, 1972 2 Sheets-Sheet 2

United States Patent Office 3,712,974

Patented Jan. 23, 1973

3,712,974

COMPUTATIONAL HEXADECIMAL SLIDE RULE

John R. Martin, Tulsa, Okla., assignor to Mar-Com Development, Inc., Tulsa, Okla.

Filed Jan. 7, 1972, Ser. No. 216,123

Int. Cl. G06g *1/02*

U.S. Cl. 235—70 R 6 Claims

ABSTRACT OF THE DISCLOSURE

Disclosed herein is a method and apparatus for the rapid addition and/or subtraction computation of higher order mathematics. The method and apparatus are particularly applicable for alphameric manipulations, for example, for the opertions of hexadecimal subtraction and addition.

BACKGROUND OF THE INVENTION

The present invention provides a method and apparatus for higher order alphameric subtraction and addition. More particularly, the method and apparatus of the present invention provide a means wherein the rapid computation of hexadecimal addition and sustration and other higher order alphameric mathematical systems may be accomplished.

The use of higher than decimal order addition and subtraction systems, for example a hexadecimal system, working with alphameric symbols, that is systems containing both numbers and letters, often appear strange to, and are difficult for, the manipulator. The growth of the hexadecimal system, especially in relation to the higher order computer languages, requires a particular degree of skill which must be met by reorientation and practice through use of the hexadecimal system. A tabulation may be prepared for hexadecimal addition or subtraction. As shown in the accompanying table, the abscissa delineates the numbers one through nine followed by the letters A, B, C, D, E, F and then the number 10, with the ordinate being similarly disposed. The table allows cross additions and subtractions for each example of use, having a total entry of two hundred fifty-six alphameric solutions. Although the use of the table is simple, one would not be expected to memorize such results, nor is the table readily suited for the addition of higher order numbers represented by the alphameric system in that one must cross columns in order to utilize the tables for higher order addition and subtraction.

In general, if a carry develops during hexadecimal addition, it is convenient to mentally add the one carry to the lower-valued of the two operands and then add to the other operand by the use of the addition table; the carry is then accounted for by going to the next square to the right or below the intersection that represents the sum of the digits, known as the conventional method. As an example of this use, to add the digits 7 plus C plus 1 (carry), one may add 7 plus 1 (carry) equals 8, and then look up the result of adding 8 (column) plus C (row) at the intersection of the 8-column and the C-row, which would show 14, found by the tabulator method.

Alternatively, one can add 7 (column) plus C (row) by use of the table, finding 13 at the intersection; the 1 carry is then accounted for by going one square below (or to the right of) the intersection on the table, which again would yield 14 as the result, known as the payback method.

THE HEXADECIMAL SYSTEM

| 1 | 1 | 2 | 3 | 4 | 5 | 6 | 7 | 8 | 9 | A | B | C | D | E | F | 10 |
|---|---|---|---|---|---|---|---|---|---|---|---|---|---|---|---|---|
| 1 | 02 | 03 | 04 | 05 | 06 | 07 | 08 | 09 | 0A | 0B | 0C | 0D | 0E | 0F | 10 | 11 |
| 2 | 03 | 04 | 05 | 06 | 07 | 08 | 09 | 0A | 0B | 0C | 0D | 0E | 0F | 10 | 11 | 12 |
| 3 | 04 | 05 | 06 | 07 | 08 | 09 | 0A | 0B | 0C | 0D | 0E | 0F | 10 | 11 | 12 | 13 |
| 4 | 05 | 06 | 07 | 08 | 09 | 0A | 0B | 0C | 0D | 0E | 0F | 10 | 11 | 12 | 13 | 14 |
| 5 | 06 | 07 | 08 | 09 | 0A | 0B | 0C | 0D | 0D | 0F | 10 | 11 | 12 | 13 | 14 | 15 |
| 6 | 07 | 08 | 09 | 0A | 0B | 0C | 0D | 0E | 0F | 10 | 11 | 12 | 13 | 14 | 15 | 16 |
| 7 | 08 | 09 | 0A | 0B | 0C | 0D | 0E | 0F | 10 | 11 | 12 | 13 | 14 | 15 | 16 | 17 |
| 8 | 09 | 0A | 0B | 0C | 0D | 0E | 0F | 10 | 11 | 12 | 13 | 14 | 15 | 16 | 17 | 18 |
| 9 | 0A | 0B | 0C | 0D | 0E | 0F | 10 | 11 | 12 | 13 | 14 | 15 | 16 | 17 | 18 | 19 |
| A | 0B | 0C | 0D | 0E | 0F | 10 | 11 | 12 | 13 | 14 | 15 | 16 | 17 | 18 | 19 | 1A |
| B | 0C | 0D | 0E | 0F | 10 | 11 | 12 | 13 | 14 | 15 | 16 | 17 | 18 | 19 | 1A | 1B |
| C | 0D | 0E | 0F | 10 | 11 | 12 | 13 | 14 | 15 | 16 | 17 | 18 | 19 | 1A | 1B | 1C |
| D | 0E | 0F | 10 | 11 | 12 | 13 | 14 | 15 | 16 | 17 | 18 | 19 | 1A | 1B | 1C | 1D |
| E | 0F | 10 | 11 | 12 | 13 | 14 | 15 | 16 | 17 | 18 | 19 | 1A | 1B | 1C | 1D | 1E |
| F | 10 | 11 | 12 | 13 | 14 | 15 | 16 | 17 | 18 | 19 | 1A | 1B | 1C | 1D | 1E | 1F |
| 10 | 11 | 12 | 13 | 14 | 15 | 16 | 17 | 18 | 19 | 1A | 1B | 1C | 1D | 1E | 1F | 20 |

It is readily depicted, therefore, that hexadecimal addition for higher order alphameric solutions is relatively complicated, even with the use of the alphameric table for aiding in the solution.

Hexadecimal subtraction follows the same rules as decimal and binary subtraction, with the improvision that a carry or borrow of one in a hexadecimal notation represents the number 16. The same table used for hexadecimal addition may also be used for the subtraction process. The alternate procedure is utilized to find the solution during subtraction. One locates the column heading that represents the digit to be subtracted, known as the subtrahend, then traverses down the column to the digit that represents the minuend and looks at the heading of the row horizontally across from the minuend which would represent the difference between the two digits. As in the addition sequence, when the subtrahend digit is greater than the minuend digit, it will be necessary to add in a borrow of one to the minuend digit before looking up the difference in the table. Either, the conventional or the payback method of subtraction, as previously discussed, may be utilized to find the solutions.

Therefore, the advent of systems computation, utilizing hexadecimal addition and subtraction, has formulated a need for a rapid means of performing alphameric addition and subtraction functions without the use of complicated tables. These mathematics generally take the form of four digit computations requiring multiple carrying operations. What is required then, is a method and apparatus for rapidly discerning the results of hexadecimal and other higher order addition and subtraction, especially those operations requiring carrying operations.

It is an object of the present invention to provide a method and apparatus for alphameric mathematical computations.

It is another object of the present invention to provide a method and apparatus for hexadecimal addition and subtraction.

Still a further object of the present invention is to provide a method and apparatus wherein the carrying operations experienced in multi-digit alphameric mathematical computation of high order systems, in particular during hexadecimal addition and subtraction, may be provided through mechanical means. With these and other objects in mind, the present invention may be more readily understood through referral to the accompanying drawings and following discussion:

SUMMARY OF THE INVENTION

The objects of the present invention are accomplished through the utilization of a method and apparatus for determining the solution of multidigit alphameric mathematical computations. The utilization of the apparatus and method is particularly acute wherein one or more alphameric indicators of an alphameric system are added or subtracted from each other and carrying operations are required to facilitate the alphameric solution. The improved mathematical apparatus and method of the present invention comprises placing each of the alphameric systems on interconnecting scales wherein the alphameric indicators are positioned equidistant upon each scale in the system order, wherein the opposing indicators of each ordered system may be aligned. A carry scale is placed adjacent to one of the alphameric scales for the ordered system, having equidistantly positioned carrying indicators, so as to be aligned to oppose the indicators of the scales of the alphameric system and being positioned one scale length to the offset of the interconnecting scales. Multiple disposition and alignment of the alphameric scales and carrying scales allows the exacting alignment of the scales of the system to accomplish the alphameric solution for the multidigit mathematical computation desired. Multiple alphameric scale indices are provided for the carrying operation from one set of scales to the next associated scale such that the multidigit operation is easily accomplished. It is a preferred embodiment of the present invention that the apparatus and method for determining the solution of alphameric mathematical computations be directed to the hexadecimal alphameric systems wherein the scales are positioned in linear alignment taking the form of a linear slide rule.

BRIEF DESCRIPTION OF THE DRAWINGS

The present invention may be more readily understood by referring to the accompanying figures, in which.

DETAILED DESCRIPTION OF THE INVENTION

The present invention provides apparatus and a method for the rapid computation of alphameric addition and subtraction and has a further provision for accounting for the carry associated with computations with alphameric systems. The carry is an inherent part of hexadecimal and other higher order alphameric systems and is developed during the subtraction and addition solutions. The carry operation is not readily accomplished by tabular and other method forms.

The particular aspects of the apparatus and method of the present invention are most readily provided by referral to the accompanying figures.

Figure 1:
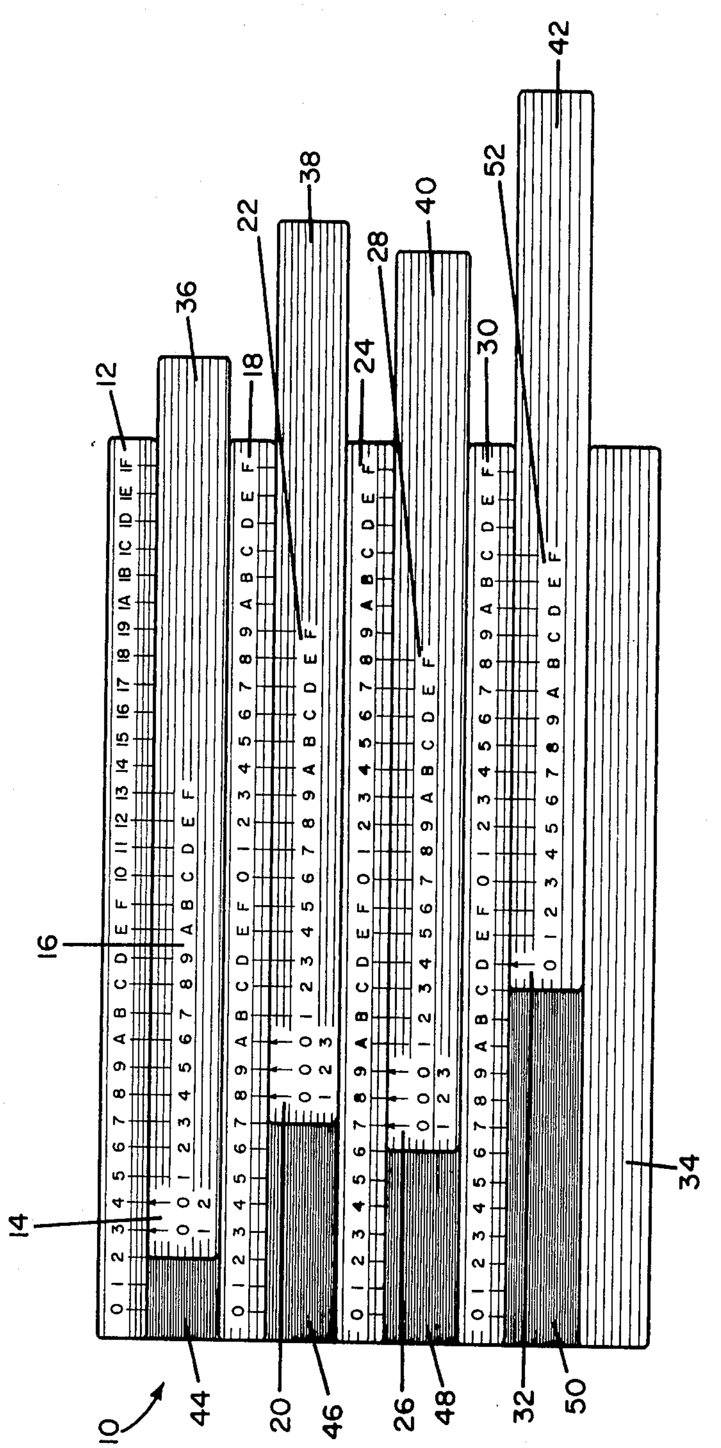
FIG. 1 represents a first top view of a multiscale mechanical slide rule type apparatus having depicted thereon the hexadecimal scales in the particular linear alignment as disclosed herein for the accomplishment of the method of the present invention for a subtraction operation.

In FIG. 1 the hexadecimal scales are depicted in a particular linear alignment for accomplishment of a four digit subtraction sequence utilizing hexadecimal mathematical manipulations. In particular, slide rule 10 is depicted and formed of a main body 34 having sliding arms 36, 38, 40 and 42 contained therein races 44, 46, 48, and 50, respectively. The sliding arms being disposed within the slots so as to have linear movement providing a mechanical apparatus for functioning as a slide rule. A first scale 12 is provided having alphameric sequence 0 through 9, A, B, C, D, E, F, and the carry indicators 10 through 19, and 1A, 1B, 1C, 1D, 1E, and 1F, respectively. Adjacent sliding arm 36, held within race 44, has positioned thereon a double zero indices 14 indicated by the indice double zero markers and arrows being numbered in the uppercase "1," "2," and in the lower case "2," "3" as explained hereinafter. Sliding arm 36 has an alphameric scale "16" disposed thereon in equidistant position in accordance with the first scale 12. To form a set the alphameric scale 16 having alphameric digits 1 through 9, A, B, C, D, E, and F. In similar manner alphameric scales 18, 24, and 30 are equally disposed in alphameric order of 0 through 9, A, B, C, D, E, F, and repeat of sequence 0 through 9, A, B, C, D, E, F of the hexadecimal system. Scales 18 and 24 have associated scales 22 and 28 respectively located upon sliding members 38 and 40 contained within races 46 and 48. Scales 22 and 28 consist of a triple zero indices indicated by the indicating arrows identified as indices 20 and 26 respectively and having subnumeration "1," "2," "3" thereon as described hereafter. The alphameric scales 22 and 28 have enumerated therein the numbers 1 through 9, and the letters A, B, C, D, E, F. The fourth sliding member 42, contained within race 50 has an alphameric scale 34 equidistantly disposed thereupon with the zero indice 32 and the alphameric characters 1 through 9, A, B, C, D, E, F, in linear alignment therewith the hexadecimal scale 30 of the main member 44. The particular disposition of sliding members 36, 38, 40 and 42 thereon the main member 34 and the linear alignment of the scales 12, 16, 18, 22, 24, 28, 30 and 34 form sets and afford an exact hexadecimal subtraction sequence of:

$$\begin{array}{r} \text{F37A} \\ -\text{B9ED} \\ \hline \text{387D} \end{array}$$

In the subtraction sequence one sets all the alphameric characters and then reads from bottom to top to find the answer. For example, for the subtraction of D from A, one sets the alphameric D character of scale 34 opposite the alphameric A character of scale 30. In a similar manner for the subtraction of E from 7, one sets the alphameric character E of scale 38 opposite the alphameric character 7 of scale 24. For the subtraction of 9 from 3 one sets the alphameric character 9 of scale 22 opposite the alphameric character 3 of scale 18, and for the subtraction of B from F, one sets the alphameric character B of scale 16 opposite the alphameric character F of scale 12. It is noted that all the characters are right end justified in order to utilize the right scales of scales 30, 24, 18 and 12 in respective sequence in order to provide for the subtraction operation of the hexadecimal system. In order to read the answer, utilizing the mechanical apparatus 10 of the present invention, one looks to the bottom scale 30 and reads the answer D from scale 30. The solution is shown opposed to the zero indice 32 leaving D above the arrow as indicated being the answer of subtraction of D from A. In the subtraction sequence if the first scale answer is found to the left of the middle 0 of scale 30 one reads the answer for scale 24, for the second operation, utilizing the first zero indice as indicated by the number "1" below the triple indice. If the answer on scale 30 is found to the right of the middle of scale 30 for the subtraction of D from A, one sets the alphameric D character of scale 34 opposite the alphameric A character of scale 30. In a similar manner for the subtraction of E from 7, one sets the alphameric character E of scale 28 opposite the alphameric character 7 of scale 24. For the subtraction of 9 from 3 one sets the alphameric character 9 of scale 22 opposite the alphameric character 3 of scale 18, and for the subtraction of B from F, one sets the alphameric character B of scale 16 opposite the alphameric character F of scale 12. It is noted that all the characters are right end justified in order to utilize the right scales of scales 30, 24, 18 and 12 in respective sequence in order to provide for the subtraction operation of the hexadecimal system. In order to read the answer, utilizing the mechanical apparatus 10 of the present invention, one looks to the bottom scale 30 and reads the answer D from scale 30. The solution is shown opposed to the zero indice 32 leaving D above the arrow as indicated being the answer of subtraction of D from A. In the subtraction sequence if the first scale answer is found to the left of the middle 0 of scale 30 one reads the answer for scale 24, for the second operation, utilizing the first zero indice as indicated by the number "1" below the triple indice. If the answer on scale 30 is found to the right of the middle 0 of scale 30, indicating a carry operation, one reads the answer on scale 24 utilizing the second zero indice as indicated by the number "2" and the arrow of indice 26. Therefore, utilizing these rules, the answer for the subtraction of E from 7 utilizing the first zero indice would find an answer on scale 24 of 7. In a similar manner, for reading scale 18 and the the answer using the triple indices 20 of scale 22, since the answer on scale 24 was found to the left of the center 0 of the alphameric scale 24 one uses the first zero labeled "1" of scale 20, for the answer of the subtraction of 9 from 3 finding an answer of 8. Should the answer of scale 24 have been found to the right of the middle indice one would have utilized the second zero indice of scale 20 in order to find the alphameric answer involved. In still similar procedure, in order to read the answer of subtraction of alphameric character B from alphameric character F, upon scale 12. As the answer as read on scale 18 was found to the left of the middle 0 one would utilize the first zero indice of double indices 14 as indicated by the upper number "1" in order to read the answer 3 from scale 12. Had the answer of scale 18 been found to the right of the 0 alphameric character of scale 18, one would utilize the second zero indice of double indice 14 indicated by the upper "2" markings in order to have read the number for the answer on scale 12. Therefore, through the operation of the subtraction of the hexadecimal system one finds by reading the indices from top to bottom in appropriate sequence the answer 387D, easily formulating the alphameric subtraction sequence without the requirement of mentally carrying the carry numbers throughout the sequence.

Figure 2:
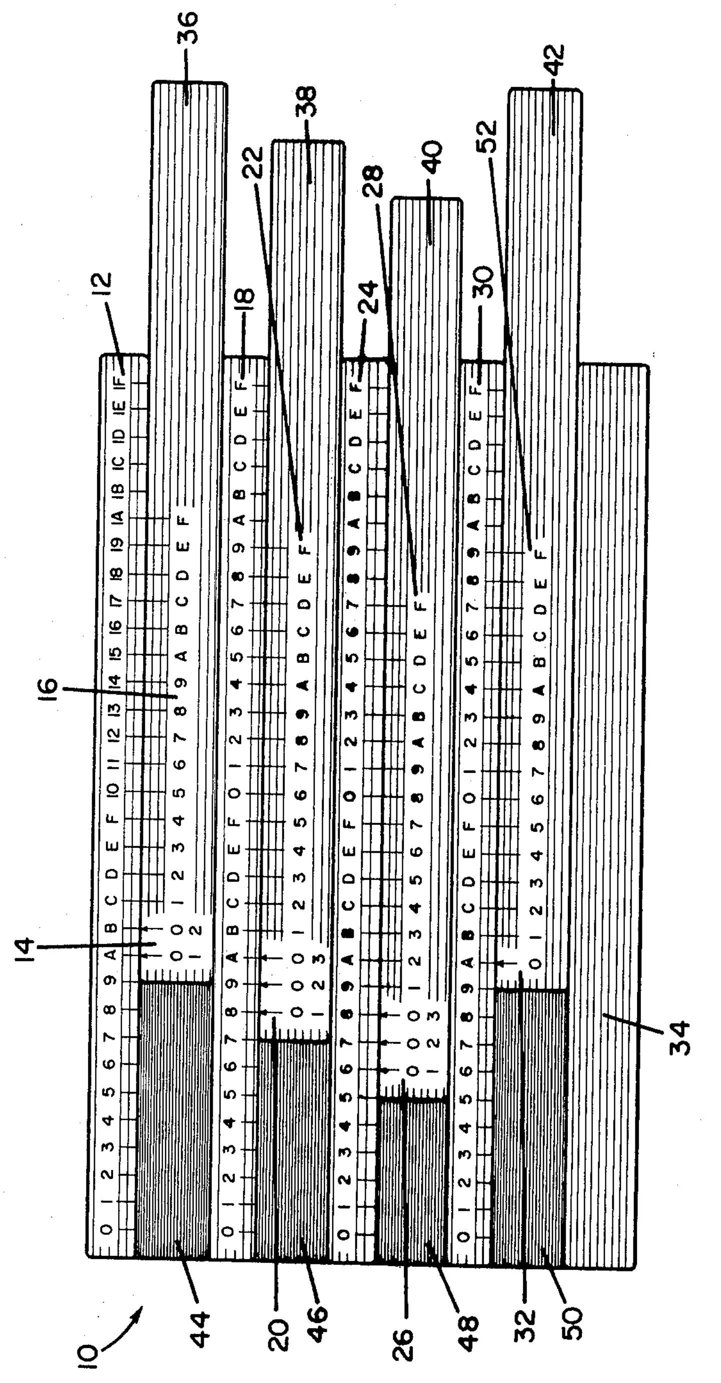
FIG. 2 represents a second top view of the multiscale slide rule of FIG. 1 in which the mechanical apparatus for utilization in conjunction with the method of the present inventions is positioned for any addition operation.

To more readily understand the hexadecimal addition sequence of the utilizing of the apparatus and method of the present invention one is referred to FIG. 2 in which a similar disposition of the mechanical apparatus 10 of the present invention is depicted with the scales disposed upon main member 34 and sliding arms 36, 38, 40, and 42 within their respective races 44, 46, 48 and 50. As an example of the utilization of the apparatus of the present invention for an addition sequence, the addition of the four digit alphameric hexadecimals B97A with 74F6 would give an answer of 12E76 utilizing the mental process or the tabular form of addition as previously disclosed, requiring several carrying operations during the mathematical addition. In utilizing the apparatus 10 of the present invention for addition, one begins with the sliding arm 42 in race 50 upon main body 34 of the apparatus 10. For the addition sequence one sets the zero indice 32 of scale 34 opposite the alphameric A, reads to the right to character C, and upwardly to find the answer of 6. In addition, using the apparatus 10 of the present invention, to utilize the second scale one must look to the answer of the first scale. If the answer is found to be to the left of the middle 0 of scale 30 one uses the third indice of triple zero indices 26 on scale 28 of sliding arm 40. For the sequence previously disclosed for the addition of A and C for the answer 6, one finds the answer to be found to the right of the middle 0 of scale 30 such that one utilizes the second zero of triple zero indice 26 for the initiation of the second addition of the four digit problem. Therefore, the second zero indice of triple zero indice 26 as indicated by the numeral "2" below the zero indice is set opposite 7 with one reading to the right on scale 28 to F and looking upwardly for the answer on scale 24 of 7. In a similar manner as the answer on scale 24 falls to the right of the middle 0 of scale 24, for the third operation one moves sliding arm 38 and scale 22 thereon so that the triple zero indice 20 utilizes the second zero indicated by the number "2" again to be placed opposite 9 reading to the right on scale 22 to the number 4 and looking upwardly for the answer on scale 18 of E. For the final operation, as the answer E falls to the left of the 0 indice indicating no carry in this operation, one utilizes the third 0 of the double zero indice 14 on sliding arm 36 as indicated by the lower number "3" on the double indice 14, utilizing the third zero indice "3," and placing it opposite B on scale 12, one reads to the right on scale 16 to the number 7 and looks up for the carry answer of 12 on scale 12, therein giving the answer of the operation of 12E76.

Therefore, by using the multiscale slide rule with the disposed scales of the present invention, for the number of digit operations to be performed, one may accomplish alphameric manipulations having carrying operations involved therewith without the utilization of any ancillary apparatus or the need for mental carrying operations requiring the operator to write down the answer of each operation before continuing with the alphameric solution. Through utilization of the apparatus and method of the present invention one is provided with a method for rapid computational addition or subtraction of alphameric mathematic operation. The apparatus and method provide for carrying operations inherent in, for example, multidigit hexadecimal addition and subtraction solutions. Therefore, the present invention provides apparatus and a method wherein hexadecimal systems may be utilized for the simplicity of decimal and binary addition techniques for the accomplishment of addition and subtraction carrying operations.

As has been depicted in the accompanying figures, a preferred embodiment of the present invention is the utilization of the multiscale linear sequence, for example, the slide rule mechanical apparatus described herein. Although radial applications of the apparatus of the present invention may be provided requiring disposition of multiradial scales being positioned so as to adapt themselves to the sequence of addition or subtraction with the carrying operations indicated herein. It has been found, however, that the linear disposition of horizontal scales in the form of a slide rule appears to be more readily adaptable for utilization than the radial techniques. Also, as depicted, equidistant positioning of the numbers and letters of the alphameric scale is favored as it provides for a simple linear relationship to the scales to the carrying and straight addition and subtraction operations. It has also been found that other systems higher than decimal order, including pentadecimal, heptadecimal, octadecimal systems, may be easily provided for by use of the apparatus as disclosed herein, it being known that the lower order computer language prefer octadecimal systems wherein higher order sixteen bit computer operations utilized the hexadecimal system as preferred and shown in the embodiment herein.

While the present invention has been described herein with particular embodiment thereof, it will be appreciated by those skilled in the art that various changes and modifications may be made without departing from the scope and spirit of the present invention.

Therefore I claim:

1. In a method for determining the solution of multi-digit alphameric mathematical computations wherein two or more alphameric characters of an alphameric system are added to or subtracted from each other and carrying operations are required to facilitate the alphameric solution, the improvement which comprises:
   (a) placing each of the alphameric systems on a plurality of interconnecting scales wherein the alphameric characters are positioned equidistant upon each scale in the order of the system, wherein the opposing characters of each ordered system may be aligned, the first scale having double indices, the intermediate scales having triple indices and the last scale having a single indice;
   (b) placing a carry scale for the ordered alphameric system, having equidistantly positioned carry characters thereon, in continuous alignment with the first scale of step (a); and
   (c) aligning the scales of the system to denote the solution of the alphameric operation.

2. The method of claim 1 wherein:
   (a) the alphameric system is hexadecimal; and
   (b) there are four sets of scales.

3. The method of claim 1 wherein the scales are placed in linear alignment.

4. An alphameric slide rule for alphameric mathematical computations wherein two or more alphameric characters of an alphameric system are to be added to or subtracted from each other and carrying operations are required to facilitates the aliphameric solution, which comprises:
   (a) a main body member having a plurality races therein;
   (b) sliding members positioned within the races of the main body member.
   (c) a first alphameric scale positioned upon the main body member in alignment with the first sliding member and having the ordered alphameric characters of the alphameric system equidistantly disposed thereon;
   (d) an ordered alphameric carry scale positioned on the main body in continuous alignment with the first alphameric scale;
   (e) a plurality additional alphameric scales being double ordered and positioned upon the main body member in alignment with each of the additional sliding members and having the ordered alphameric characters of the alphameric systems equidistantly disposed thereon;
   (f) a first sliding member scale having a double zero indice positioned upon the first sliding member and having the ordered alphameric characters thereon equidistantly disposed thereon so as to be aligned with the first alphameric scale;
   (g) a plurality additional sliding member scales having triple zero indices positioned upon the respective sliding members and having the ordered alphameric characters thereof equidistantly disposed thereon so as to be aligned with the one or more additional alphameric scales; and
   (h) a last sliding member scale having a single zero indice positioned upon the last sliding member and having the ordered alphameric characters thereof equidistantly disposed thereon so as to be aligned with the last alphameric scale positioned upon the main body member.

5. The alphameric slide rule of claim 4 wherein the alphameric systems are hexadecimal.

6. The alphameric slide rule of claim 5 wherein there are four sliding members all of which are positioned in linear alignment with the alphameric scales of each and the alphameric scales of the main body member.

References Cited

UNITED STATES PATENTS

| | | | |
|---|---|---|---|
| 3,604,620 | 9/1971 | Rakes | 235—69 |
| 3,654,438 | 4/1972 | Wyatt et al. | 235—84 |
| 3,654,437 | 4/1972 | Wyatt et al. | 235—84 |
| 3,670,958 | 6/1972 | Radosavljevic | 235—70 A |

RICHARD B. WILKINSON, Primary Examiner

S. A WAL, Assistant Examiner